(12) United States Patent
Ridenour et al.

(10) Patent No.: US 9,386,318 B2
(45) Date of Patent: Jul. 5, 2016

(54) LOSSLESS IMAGE COMPRESSION USING DIFFERENTIAL TRANSFER

(71) Applicant: Apple Inc., Cupertino, CA (US)

(72) Inventors: Robert L. Ridenour, Sunnyvale, CA (US); Jeffrey E. Frederiksen, Cupertino, CA (US); Ian C. Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 14/035,682

(22) Filed: Sep. 24, 2013

(65) Prior Publication Data

US 2014/0161367 A1   Jun. 12, 2014

Related U.S. Application Data

(60) Provisional application No. 61/736,462, filed on Dec. 12, 2012.

(51) Int. Cl.
| | |
|---|---|
| G06T 9/00 | (2006.01) |
| H04N 19/137 | (2014.01) |
| H04N 19/115 | (2014.01) |
| H04N 19/12 | (2014.01) |
| H04N 19/176 | (2014.01) |
| H04N 19/46 | (2014.01) |
| H04N 19/30 | (2014.01) |
| H04N 19/15 | (2014.01) |
| H04N 19/63 | (2014.01) |
| H04N 19/107 | (2014.01) |
| H04N 19/547 | (2014.01) |

(52) U.S. Cl.
CPC ........... *H04N 19/137* (2014.11); *H04N 19/115* (2014.11); *H04N 19/12* (2014.11); *H04N 19/107* (2014.11); *H04N 19/15* (2014.11); *H04N 19/176* (2014.11); *H04N 19/30* (2014.11); *H04N 19/46* (2014.11); *H04N 19/547* (2014.11); *H04N 19/63* (2014.11)

(58) Field of Classification Search
None
See application file for complete search history.

(56) References Cited

U.S. PATENT DOCUMENTS

| | | | |
|---|---|---|---|
| 5,610,657 | A | 3/1997 | Zhang |
| 5,838,377 | A | 11/1998 | Greene |
| 8,229,245 | B2 | 7/2012 | Mallat et al. |
| 8,520,734 | B1 * | 8/2013 | Xu .......................... 375/240.16 |

(Continued)

OTHER PUBLICATIONS

International Search Report and Written Opinion from PCT/US2013/074432, mailed Mar. 19, 2014, Apple Inc., pp. 1-16.

(Continued)

*Primary Examiner* — Sean Motsinger
(74) *Attorney, Agent, or Firm* — Robert C. Kowert; Meyertons, Hood, Kivlin, Kowert & Goetzel, P.C.

(57) ABSTRACT

Lossless image compression using differential transfers may involve an image compression unit receiving image data for an image in a sequence of images and transmitting the image data such that image data for at least some image tiles is transmitted using lossy compression due to resource limitations. The image compression unit may then receive image data for a subsequent image in the sequence and determine that the image data for at least some tiles does not change relative to the image data for corresponding tiles of the previous image. The image compression unit may then transmit image data in a manner sufficient to create lossless versions of tiles for which lossily compressed image data was sent previously.

17 Claims, 10 Drawing Sheets

(56) References Cited

U.S. PATENT DOCUMENTS

| | | | |
|---|---|---|---|
| 2002/0136304 A1* | 9/2002 | Akhan et al. | 375/240.16 |
| 2006/0115166 A1* | 6/2006 | Sung | H04N 19/61 382/239 |
| 2011/0135009 A1 | 6/2011 | Sugita | |
| 2011/0141133 A1* | 6/2011 | Sankuratri et al. | 345/600 |
| 2013/0050254 A1* | 2/2013 | Tran et al. | 345/629 |

OTHER PUBLICATIONS

Amir Said, et al., "A New, Fast, and Efficient Image Codec Based on Set Partitioning in Hierarchical Trees" IEEE Transactions on Circuits and Systems for Video Technology, vol. 6, No. 3, Jun. 1996, pp. 243-250.

Claudia Mayer, "Motion Compensated In-Band Prediction for Wavelet-Based Spatially Scalable Video Coding", Institute of Communications Engineering, 2003, pp. III-73 to III-76.

Deividas Kančelkis et al, "A New Le Gall Wavelet-Based Approach to Progressive Encoding and Transmission of Image Blocks", Kaunas, Lithuania, 2012, pp. 1-9.

Jonas Valantinas, et al "A New Wavelet-Based Approach to Progressive Encoding of Regions of Interest in a Digital Signal" Kaunas, Lithuania, 2009, pp. 1-8.

* cited by examiner receive compressed image data for an image in a sequence of images where the image data for at least some of the tiles of the image was sent using lossy compression
900 receive compressed image data for a subsequent image in such a manner as to create lossless versions of tiles which were previously sent using lossy compression.
910

LOSSLESS IMAGE COMPRESSION USING DIFFERENTIAL TRANSFER

This application claims priority to U.S. Provisional Patent Application No. 61/736,462, filed Dec. 12, 2012, which is incorporated herein by reference in its entirety.

BACKGROUND

Visual images captured and/or displayed by an electronic device are often characterized by a significant memory footprint (i.e. the amount of memory consumed to store data representing the image). As the resolution of the images increases, the memory footprint of the image increases. Various electronic devices are expected to be capable of processing such images. For example, mobile electronic devices such as mobile telephones and personal digital assistants are often equipped with cameras to take still photographs, or even video. While current image capture sensors included in such devices are frequently capable of about 2-4 megapixels, the sensors included in newer phones will continue to increase in resolution. Additionally, such devices are being equipped with higher resolution screens, and thus the footprint of images for display also increases. Such devices may also be designed to output high resolution images/video to an external device, and the footprint of the high resolution images is large.

While the size of memory in such devices is also increasing over time, the size of the memory may not increase at the same rate as the image resolution and/or size. Additionally, such devices are increasingly providing significant functionality for other purposes. For example, smart phones are beginning to provide multi-threaded processing to support multiple applications executing on the phone concurrently. Each application consumes memory for the code being executed and the data being operated upon, which places further pressure on the memory capacity. Furthermore, the applications compete for access to the memory (e.g. bandwidth), which may place pressure on an interconnect between the memory and the memory controller, and between the memory controller and other devices in the system such as the processors, graphics devices, display controllers, etc.

Images can be transmitted and stored in compressed form. However, during image capture and display, time and hardware requirements to compress and decompress images may be prohibitive.

SUMMARY

The systems and methods described herein demonstrate a variety of techniques for lossless image compression using differential transfers. Lossless image compression, as described herein, may involve taking advantage of instances in which an image (or a portion of an image) does not change across multiple frames (or other sequences of images). Image data representing only an approximate version of the image may have to be sent due to bandwidth (or other resource) limitations. While the next frame is being processed, if the image did not change, additional image information may be sent that allows a complete version of the image to be generated. Thus, lossless image compression using differential transfers may allow a complete version of an image to be generated when the complete data for the image may not be transferrable (even when compressed) due to bandwidth limitations.

For example, image data for one frame of video may be compressed using a lossy compression due to bandwidth or space constraints. Once transferred, the lossily compressed image data may represent only an approximate (or lossy) version of the frame. When the next frame is processed, if that frame didn't change (or didn't change much) image data may be transferred that allows generation of a complete (or lossless) version of the frame. Thus, if a non-changing image was not sent losslessly due to data rate (or other resource) restrictions, subsequent differential transmissions may complete the received image data to generate a fully lossless result after two or more frames.

When compressing and transferring a sequence of images, such as video, not all portions of an image frame may change at the same time or at the same rate across multiple frames. Thus, after sending lossily compressed image data (due to resource/bandwidth limitations) for a portion of an image, that portion of the image may not change in the next frame. By taking advantage of the fact that a particular portion of an image does not change in a subsequent frame, additional image data for that portion of the image may be sent in such a manner to allow generation of lossless image data for that portion of the image.

Figure 1:
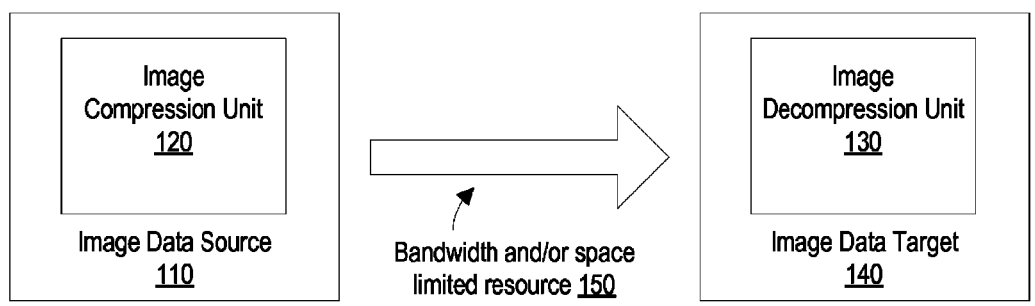
FIG. 1 is a logical block diagram illustrating, according to one embodiment, is a block diagram of one embodiment of a generic data source and data target using compression and decompression.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Lossless image compression using differential transfers, as described herein, may be include initially transferring image data using lossy compression due to resource limitations, but subsequently transferring image data in such a way as to generate lossless image data, according to some embodiments.

As described herein, lossless image compression using differential transfers may be implemented by an image compression unit and a compatible image decompression unit. An image compression unit may perform compression of images with low latency and relatively little hardware. Similarly, an image decompression unit may decompress the images with low latency and little hardware. Lossless image compression using differential transfers may lessen bandwidth pressure on interconnects between memory and devices/modules that manipulate images, as well as competition for memory space between the image data and other data storage.

Images may be processed (analyzed, compressed, transferred, decompressed, etc.) as a series of image tiles. Each tile may be of uniform size and represent a portion of the overall image. Thus, each image frame in a video sequence may be processed as a set of tiles that, when displayed together, form an entire time frame. Lossless image compression using differential transfers, as described herein, may be applied to individual tiles of images (e.g., frames) in a sequence of images (e.g., video).

For example, an image compression unit may only send a portion of the image data for one (or more) of the tiles of an image frame due to limited bandwidth (such as a limitation between memory and a display controller or other resource limitations). The partial image data may be usable to generate an approximate (e.g., lossy) version of that image tile. Then, if the content (e.g., the image/graphics) of that tile do not change in the next frame, the image compression unit may then send image data for that tile that allows an exact (e.g., lossless version) of that tile to be generated. For example, in one embodiment, when processing the next frame the image compression unit may send the remainder of the image data for the tile such that, when combined with the previously sent image data, a complete version of the image tile may be created.

Please note that while described herein in terms of images and using examples based on images, lossless image compression using differential transfers may be applied to data and/or information other than images. For example, any set of data which can be analyzed as a sequence frames can be transferred using the systems, methods and techniques described herein.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Turning now to FIG. 1, a block diagram is shown of a generic image data source 110 and a generic image data target 140 coupled via a channel 150 that includes at least one bandwidth-limited and/or space-limited resource. The image data source 110 includes an image compression unit 120, and the image data target 140 includes an image decompression unit 130.

Generally, the image data source 110 may be configured to transfer data over the channel 150 to the image data target 140. The image data source 110 may generate the data (e.g. the image data source 110 may be a sensor, such as a camera for graphical images), or may receive the data from other circuitry and may optionally process the data to transform the data in some defined fashion. The image data source 110 may then compress the data using the image compression unit 120. Generally, the compression may be a transformation of the data, reducing the size of the data in the transformation, according to some embodiments.

Compression may be lossless or lossy. With lossless compression, the original data may be recovered in its exact form after compression and subsequent decompression. Accordingly, lossless compression algorithms may focus on removing redundancy in the original data and encoding the data more efficiently, but in a fashion that retains all information content. For example, a long consecutive string of the same value in the data can be replaced with a more efficient coding such as a count of the number of instances of the value followed by one instance of the value itself. In lossy compression, the decompressed data (resulting from compressing the original data and decompressing the compressed data) is an approximation of the original data. Particularly with graphical images, lossy compression may produce decompressed images that are virtually indistinguishable from the original image when viewed by the human eye, even though the decompressed images have lost some of the content that represents the image. Alternatively, lossy compression may result in decompressed images having noticeable differences from the original image, but the differences may be considered acceptable to the viewer.

By compressing the data and transferring the compressed data over the channel 150, the image data source 110 may consume less of the available bandwidth and/or storage space in the channel 150. For example, the channel 150 may include one or more interconnects over which the data is transmitted. Each interconnect may have a maximum bandwidth, and at least some of the interconnect bandwidths may be insufficient to support transmission of the uncompressed data in "real time." That is, the uncompressed data may be generated or received by the image data source 110 at a particular rate. If the bandwidth available to the image data source 110 is less than the rate, then the uncompressed data cannot be transmitted without stalling, or back-pressuring, the data generation/receipt rate. In some cases, it may not be acceptable to stall the data generation/receipt rate. For example, if the image data source 110 is a camera sensor, the data representing an image must be transmitted before the sensor captures the next image. If the image data source 110 is providing video, the images are being transmitted at a particular frame rate and stalling leads to lost frames.

In addition to bandwidth limitations, space limitations may present issues to transmitting the uncompressed data. For example, the channel 150 may include local memory buffers and/or a main memory system in the device that includes the image data source 110 and the image data target 140. The size of the data in memory (it's "footprint") may consume all of the available memory, or a sufficiently large portion of the memory that other data is crowded out of the memory.

Even in cases in which the bandwidth and space characteristics of the channel 150 are sufficient to handle the uncompressed data, higher performance in the system overall (in which other activities are being performed beyond the transfer of data from the image data source 110 to the image data target 140 which may need access to the channel 150) may be achieved by reducing the load of the image data source 110 on the channel 150.

The image decompression unit 130 is configured to reverse the operation of the image compression unit 120, producing the original uncompressed data or an approximation thereof. That is, the image decompression unit 130 is designed with an awareness of the compression algorithm used by the image compression unit 120. Additionally, if parameters of the compression algorithm are programmable, both the image compression unit 120 and the image decompression unit 130 may be programmed in the same fashion to ensure that the image decompression unit 130 properly interprets the received data.

Additionally, both the image data source and the image data target may include reference buffers allowing differential data to be encoded. Thus, in some embodiments, image compression unit 120 may be configured to store to a reference buffer the image data that has been sent and compare future image data against that stored in the reference buffer and send image data representing the difference between the two. Similarly, in some embodiments, image decompression unit 130 may be configured to maintain a reference buffer of received image data and compare newly received differential image data against that in the reference buffer in order to generate complete image data.

In the case of image data, the frame of data that represents the image may have a spatial relationship. The frame of data may, for example, represent the colors of a set of pixels arranged in a two dimensional format. Within a frame, a tile may be defined which includes a subset of the pixels. The size of the tile, e.g. the number of pixels, may be configurable. One implementation of the compression unit 120/decompression unit 130 may provide good compression ratios with good image results for about 1000 to 2000 pixels per tile. Thus, for example, tiles of 32 pixels horizontal by 32 pixels vertical (32×32) may be defined and such tiles include 1024 pixels. Additionally, the shape of the tile may be varied in various embodiments. For example, square or rectangular tiles may be defined. Thus, a 1024 pixel tile may be 32×32, 64×16, 128×8, 256×4, etc. In tile-based implementations, each tile may be compressed as a unit and the compressed tile may be transmitted and decompressed. In another implementation, good compression results may be achieved with smaller tiles (e.g. 64 pixel tiles, in a 16×4 arrangement). Larger tiles may also be used (e.g. tiles with more than 2000 pixels) in other implementations.

Applying the compression algorithm to a tile of data may include one or more transforms applied to the data, transforming the data into a form in which at least some of the transformed data becomes zero or near-zero. For example, in some embodiments, one or more wavelet transforms may be used. In one implementation, a Haar wavelet may be applied with the coefficients [1],[1]. In another implementation, multiple wavelets may be applied in succession, including for example: Deslauriers-Dubuc (9,7) with the coefficients [1,1], [−1,9,9,−1]; LeGall(5,3) with the coefficients [1,1],[1,1]; Deslauriers-Dubuc (13,7) with the coefficients [−1,9,9,−1],[−1,9,9,−1]; and Haar with the coefficients [1],[1]. With coefficients of one and nine, and treating nine as one and eight, there may be no need for multipliers in the image compression unit 120 and image decompression unit 130. That is, the computations may be performed using shifters and adders. Other embodiments may implement any other transforms or a combination of transforms. For example, a discrete cosine transform may be used (or it's integer equivalent). An RGB to YUV transform, discussed below, may be used.

According to some embodiments, color space conversions may be used to reduce the number of color components that may be filtered by filtering hardware and/or software. For example, a red-green-blue (RGB) representation of each pixel may be converted to a YUV representation of the pixel. Most of the image information may lie in the Y component, which may be filtered. The filtered Y component and the unfiltered U and V components may then be converted back to the RGB representation, which may closely approximate the result of filtering each of the R, G, and B components. In another embodiment, a Bayer sensor output may be converted to a YUVW format (and the Y component may be filtered).

The data resulting from transforming the uncompressed data via one or more transforms may be referred to as coefficients. A coefficient may have an associated significance, based on the magnitude of the coefficient with respect to zero. For example, the coefficients resulting from the wavelet transformations discussed above may be positive signed integers. Accordingly, the most significant set bit in the coefficient may be viewed as a measure of significance of the coefficient. Multiple coefficients that have their most significant set bits in the same bit position may be referred to as a significance group. A first coefficient may be referred to as more significant than a second coefficient if the first coefficient has its most significant set bit in a more significant bit position than the bit position in which the second coefficient has its most significant set bit. Alternatively, both positive and negative signed integers may be included in the coefficients. In such a case, the most significant set bit may indicate the significance group if the integer is positive (sign bit is zero). If the integer is negative (sign bit is one), two or more most significant bits may be set. The coefficients having the same field of most significant set bits may be included in the same significance group in such embodiments.

The image compression unit 120 may order the coefficients according to the areas of data most likely to have significant coefficients, resulting in an ordered list. The image compression unit 120 may then scan the ordered list, searching for the most significant coefficients (i.e. those coefficients having the most significant bit set) and may transmit the most significant coefficients to the image data target 140. Additionally, during the scan, the image compression unit 120 may generate linked lists of coefficients for each other significance group. That is, for each bit in the coefficients, a linked list may be generated with pointers to the coefficients having that bit as the most significant set bit, thus forming the significance groups as the members of each linked list. Accordingly, in one embodiment, each coefficient may be included in only one significance group. Please note that while described herein using linked lists of coefficients, in some embodiments, significance groups of coefficients may be generated using data structures other than linked lists (e.g. arrays).

In this manner, the list of coefficients may only be scanned in full one time. The list of coefficients for each other significance group may be traversed, limiting the visiting of each remaining value to one time. Thus, the number of scans through the list may be less than two, and may be close to one. For example, about 1¼ scans of the list may be sufficient to send all coefficients, in an embodiment. Specifically, in one embodiment, the more significant coefficients may be clustered in one area of the compressed tile, with other significant coefficients appearing in small numbers in the other areas.

A coefficient may be "sent" by the image compression unit 120 by sending a location of the coefficient followed by the value of the coefficient (e.g. as a signed integer). For example, the address of the coefficient in the coefficient list may be sent as the location (or the difference in the address from the previously-sent address, referred to herein as a "delta address", for each coefficient after the first coefficient). Other embodiments may identify the location in other ways (e.g. as a pixel address within the tile or within the image). In one embodiment, the coefficient list delta address may be transmitted using an exponential coding such as the exponential Golomb code. An exponential Golomb code sends small magnitude numbers (near zero) efficiently but higher magnitude numbers inefficiently, according to some embodiments. Since the coefficient list delta address is small, the exponential Golomb code may send the addresses efficiently.

In one embodiment, the image compression unit 120 may be configured to convert the initial binary two's complement representation of the coefficients to signed magnitude coefficients. The most significant coefficients are sent initially, followed in order by the less significant coefficients until all coefficients are sent or until transmission is terminated early, such as due to lack of space (e.g. in a receiving buffer) or time. In an embodiment, the most significant bit of the coefficient value is not sent since it may always be set (i.e., a binary '1'). The remaining bits may be sent for each coefficient value. In one embodiment, the sign bit may be sent for each coefficient value when one exists. Alternatively, negative coefficient values may be sent as a separate significance group. For example, in an embodiment, the negative significant group may be sent after (or before) the equivalent significance group of positive values. In such an embodiment, the sign may be implicit.

Figure 2:
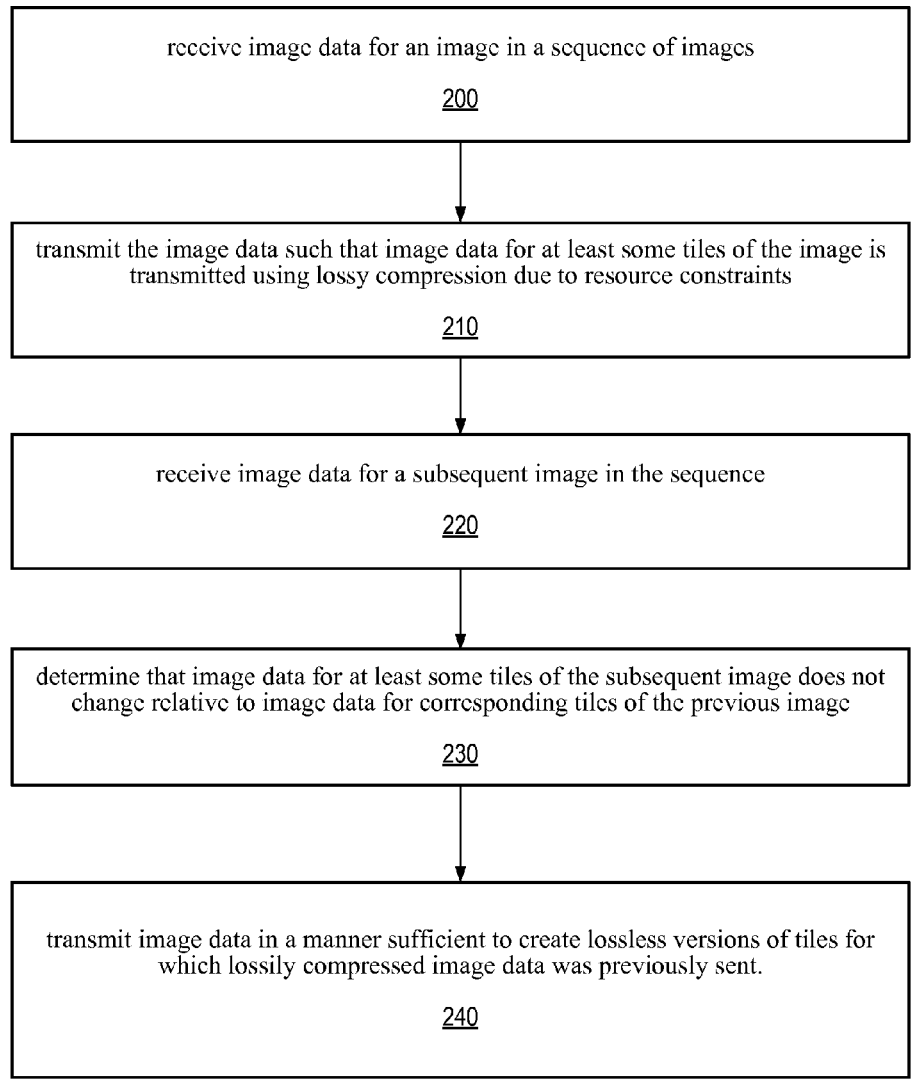
FIG. 2 is a flowchart illustrating one embodiment of a method for performing lossless image compression using differential transfers, as described herein

FIG. 2 is a flowchart illustrating one embodiment of a method for lossless image compression using differential transfers. As illustrated in block 200, an image compression unit, such as image compression unit 120, may receive image data for an image in a sequence of images, according to one embodiment. For example, image data source 110 may represent a camera and may send image data to image compression unit 120. In one embodiment, image data source 110 may be a video camera, for example, configured to continually send images (e.g., image data for each image) in a sequential manner to image compression unit 120.

Image compression unit 120 may then transmit the image data such that image data for at least some tiles of the image is transmitted using lossy compression due to resource constraints, as shown in block 210. For example, image compression unit 120 may be configured to compress and transmit image data received from image data source 110 to image data target 140, as noted above. In addition, due to the limited nature of one or more connections or channels, such as channel 150, image compression unit 120 may compress one or more tiles of the image in a lossy way (e.g., using lossy compression) and then transmit the lossily compressed image data (possibly along with losslessly compressed image data for other tiles). As noted above, image compression unit 120 may be configured to use any of various lossless and lossy compression techniques, according to various embodiments.

After transmitting the image data for the current image, image compression unit 120 may receive image data for a subsequent image in the sequence of images, as shown in block 220. Image compression unit 120 may then determine that image data for at least some tiles of the subsequent image does not change relative to image data for corresponding tiles of the previous image, as illustrated in block 230. For instance, image compression unit 120 may be configured to determine that one or more tiles of the current frame have not changed since the previous frame. This may occur, for instance, when image data source 110 is a video camera capturing an image with a static background, or when motion within the view of the camera stops, even momentarily. Thus, the image data for a tile in a subsequent frame may not have changed relative to the same tile in the previous image (e.g., frame).

Please note that image compression unit 120 may be configured to determine whether or not tiles have changed between two images using any of various techniques, according to different embodiments. For example, in one embodiment, image compression unit 120 may be configured to compare the image data for a tile between two frames. In another embodiment, image compression unit 120 may be configured to compare transformed or compressed versions of the image data when determining whether a tile has changed between two successive images (e.g., frames). In yet other embodiments, image compression unit 120 may be configured to rely on additional information (or metadata) regarding whether tiles have changed. For instance, image data source 110 may be configured to transmit image change information along with image data to image compression unit 120.

As shown in block 240, image compression unit 120 may be configured to transmit image data in a manner sufficient to create lossless versions of tiles for which lossily compressed image data was previously sent, according to one embodiment. For example, image compression unit 120 may compress image data for a first image using lossy compression for a particular tile within the image and transmit that lossily compressed image data to image decompression unit 130. For instance, image compression unit 120 may have transformed the image data into coefficients, but only transmitted half of the coefficients, such as the most significant coefficients, to image decompression unit 130. Thus, image decompression unit 130 may not be able to construct a lossless version of that particular image tile (e.g., since it received only half of the coefficients). When processing the subsequent image, however, image compression unit 120 may determine that image data for that particular tile did not change. In response to determining that the tile did not change, image compression unit 120 may then transmit image data that allows image decompression unit 130 (and/or image data target 140) to construct a lossless version of the tile.

For example, when transmitting the lossily compressed image data for the tile, image compression unit 120 may have sent only half of the transform coefficients due to limited resources on/in channel 150. When processing the corresponding tile in a subsequent image, image compression unit 120 may then transmit the other half of the coefficients to image decompression unit 130. Thus, after receiving the image data for the corresponding tile in the subsequent image (e.g., frame), image decompression unit 130 (and/or image data target 140) may have all information necessary to construct a lossless version of the tile. For instance, image decompression unit 130 may combine the newly received coefficients with the previously received coefficients to construct a lossless version of the tile (since image decompression unit 130 now has all the coefficients).

In different embodiments, image compression unit 120 and image decompression unit 130 may be configured to store and/or save various types of data/information for use with subsequent frames. For example, image decompression unit 130 may be configured to save the coefficients received with the first image (e.g., the lossily compressed version) so as to be able to combine them with coefficients received with subsequent images. In addition, image compression unit 120 may be configured to include information regarding the type of compressed image data being sent. For example, image compression unit 120 may include a flag or field indicating whether or not the image data being sent was lossily or losslessly compressed and/or whether the image data being sent should be considered in conjunction with previously sent image data. In addition, image compression unit 120 may, in some embodiments, send image change information along with the compressed image data.

While described above mainly in reference to tiles that did not change between two successive images or frames, in some embodiments, image compression unit 120 may be configured to determine how much the image data for a tile changes between two successive images and if the tile only changed less than a certain amount, image compression unit 120 may send image data for the tile in a manner sufficient to create a lossless version of the tile for which lossily compressed data was previously sent. Thus, in some embodiments, even if the image data for a tile as changed in the subsequent frame, image compression unit 120 may send image data for the tile that allows for the creation of a lossless version. For instance, image compression unit 120 may be configured to not only send the remaining coefficients that were not sent previously, but to also sent information indicating differences for the tile between the two successive frames.

Additionally, in some embodiments, image compression unit 120 may be configured to use two or more successive frames (in addition to the original lossily compressed frame) to send over the complete image data needed to generate a lossless version of a tile. For instance, image compression unit 120 may send only a portion of the transform coefficients for a tile during an initial frame and if the tile does not change during the next frame may send some of the remaining coefficients. Then if the tile does not change again between the second and third frames, image compression unit 120 may be configured to send the remaining coefficients. Thus, image decompression unit 130 may be configured to utilize information sent across two or more frames to generate a lossless version of a tile or tile.

Figure 3:
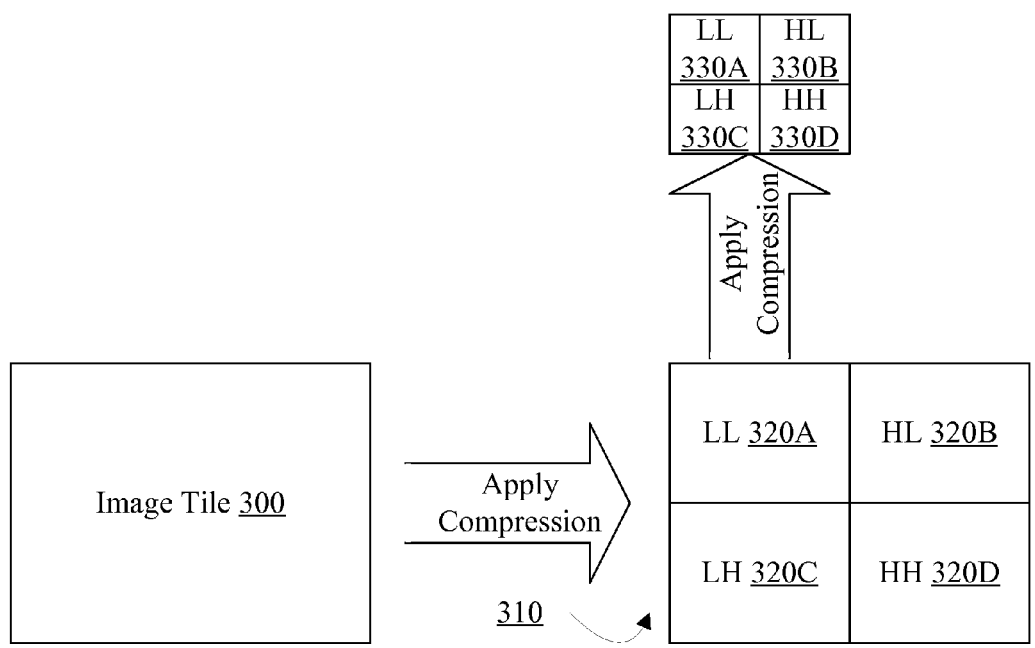
FIG. 3 is a logical block diagram illustrating an image tile being compressed using lossless image compression using differential transfers, according to one embodiment

FIG. 3 is a block diagram of one embodiment of an image tile 300. Applying a transformation (e.g. a wavelet) to the image tile 300 may produce a transformed tile 310. The transformed tile 310 is divided into 4 quadrants 320A-320D labeled LL, HL, LH, and HH, respectively. The LL quadrant 320A may generally have the most significant coefficients. The HL, LH, and HH quadrants 320B-320D may be sparsely populated with significant coefficients, typically corresponding to pixels that form an edge between colors in the image. Remaining coefficients in these quadrants are typically zero or near zero. The HH quadrant 320D may tend to be the most sparsely populated with significant coefficients. The L and the H may generally refer to low frequency components and high frequency components in the transformation. The first "L" or "H" refers to the horizontal direction and the second "L" or "H" refers to the vertical direction.

The transformation may be applied again to the quadrant 320A, producing quadrants 330A-330D. Similar to the quadrants 320A-320D, the quadrants 330A-330D are labeled LL, HL, LH and HH respectively. The transformation of the LL quadrant resulting from a previous application of a transformation may be repeated as often as desired. At some point, the HL, LH, and HH quadrants become less sparsely (more densely) populated with significant coefficients. Accordingly, the number of iterations of applying the transformation may be capped based on the reduced compression return that additional iterations would provide. A cap of 4 iterations may be chosen, in an embodiment, although more or fewer iterations may be used in other embodiments. The number of iterations may also be varied dynamically based on the number of significant coefficients that appear in the HL, LH, and HH quadrants after each iteration.

While FIG. 3 separately illustrates the image tile 300, the transformed tile 310, and the transformed quadrant 320A (as the quadrants 330A-330D), the transformation may be performed within the same memory locations, overwriting the original data in the tiles, according to some embodiments.

Figure 4:
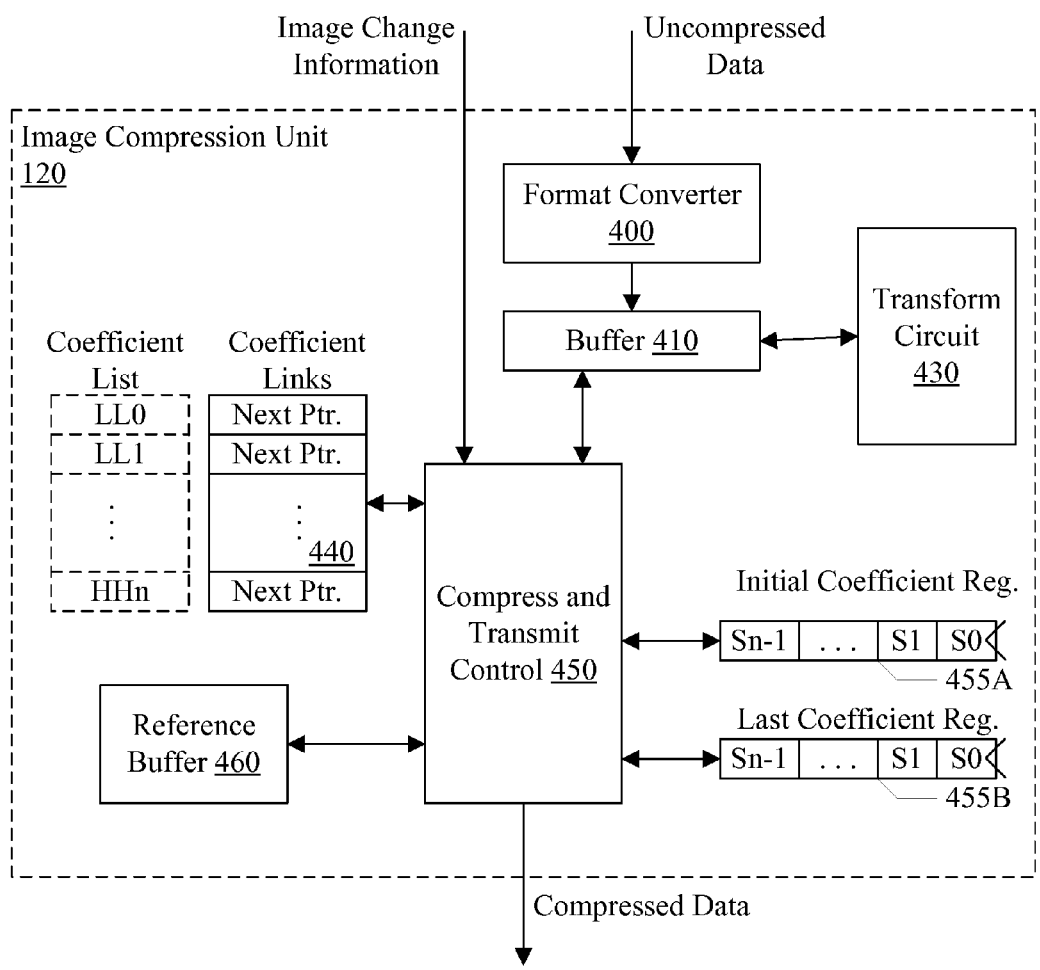
FIG. 4 is a logical block diagram illustrating one embodiment of an image compression unit capable of performing lossless image compression using differential transfers, as described herein.

Turning now to FIG. 4, a block diagram of one embodiment of the compression unit 16 is shown. In the embodiment of FIG. 4, the image compression unit 120 includes a data buffer 410, a format converter circuit 400, a transform circuit 430, a compression and transmit control circuit 450, coefficient pointer registers 455A-455B, coefficient links memory 440 and reference buffer 460. The data buffer 410 is coupled to receive data to be compressed (e.g. a tile of data), which may be transformed through the format converter circuit 400 in some embodiments, and is coupled to the transform circuit 430 and the compression and transmit control circuit 450. The compression and transmit control circuit 450 is coupled to provide compressed data for transmission, and is coupled to the coefficient links memory 440, the coefficient pointer registers 455A-455B and reference buffer 460. Each of the registers 455A-455B may include several fields labeled S0 to Sn−1 in FIG. 4 (where n is the number of bits in a coefficient). The field may store a pointer to an entry in the coefficient links memory 440 having a coefficient of the corresponding significance. For example, in one embodiment, the most significant coefficient pointer may be in the field Sn−1. The second least significant coefficient pointer may be in the field S1, and the least significant coefficient pointer may be in the field S0. The registers 455A-455B may include one or more registers as needed to provide storage for the pointers.

Each entry in the coefficient links memory 440 corresponds to a coefficient in the list of coefficients that form the compressed image. The list may be ordered beginning with the LL quadrant of the innermost compression (and with a predefined order of the LL coefficients within the quadrant, such as row-major or column-major) and proceeding through the other quadrants of each compression from innermost to outermost, reaching the HH quadrant of the outermost compression. The list is illustrated in dotted form next to the coefficient links memory 440 in FIG. 4 to represent the logical organization of the list. However, the coefficient list may physically be stored in the buffer 410 after the transformations performed by the transform circuit 430 have overwritten the original data with the transformed data, e.g. as described regarding FIG. 3.

Operation of the image compression unit 120 (and more particularly the transform circuit 430 and the compression and transmit control circuit 450, as appropriate) will be described in more detail with regard to the flowcharts illustrated in FIGS. 5 to 7. While the blocks are shown in a particular order for ease of understanding, other orders may be used. Blocks may be performed in parallel in combinatorial logic in the image compression unit 120. Blocks, combinations of blocks, and/or the flowcharts as a whole may be pipelined over multiple clock cycles. The image compression unit 120 may be configured to implement the operation illustrated by the flowcharts.

Figure 5:
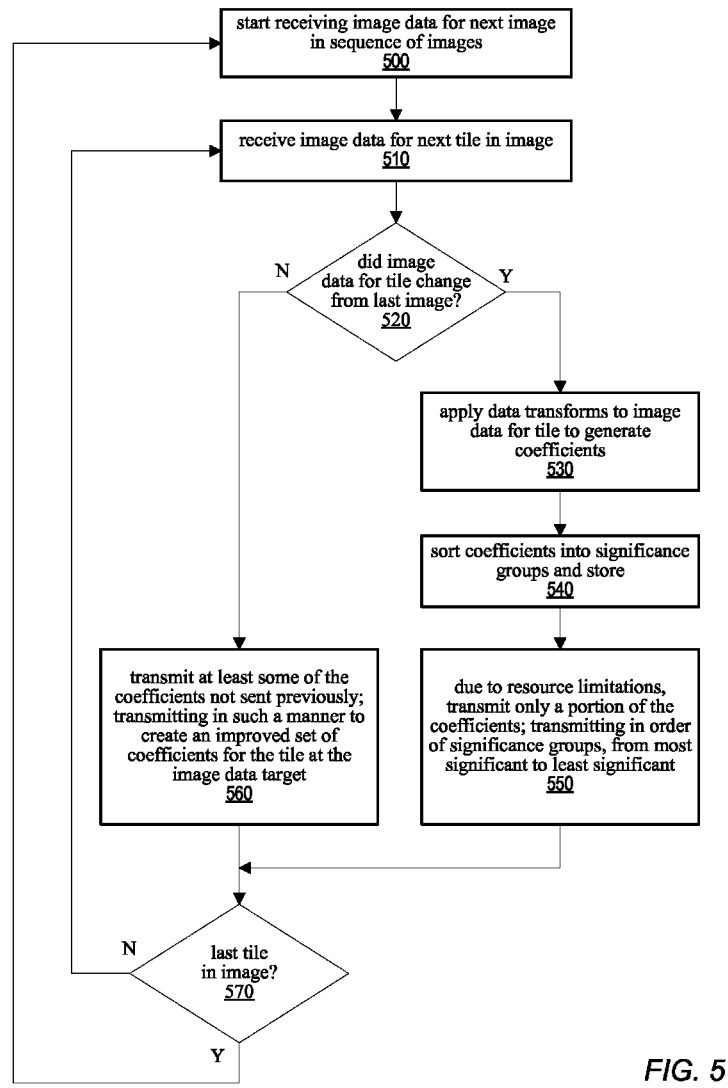
FIG. 5 is a flowchart illustrating one embodiment of a method for using lossless image compression using differential transfers.
Figure 6:
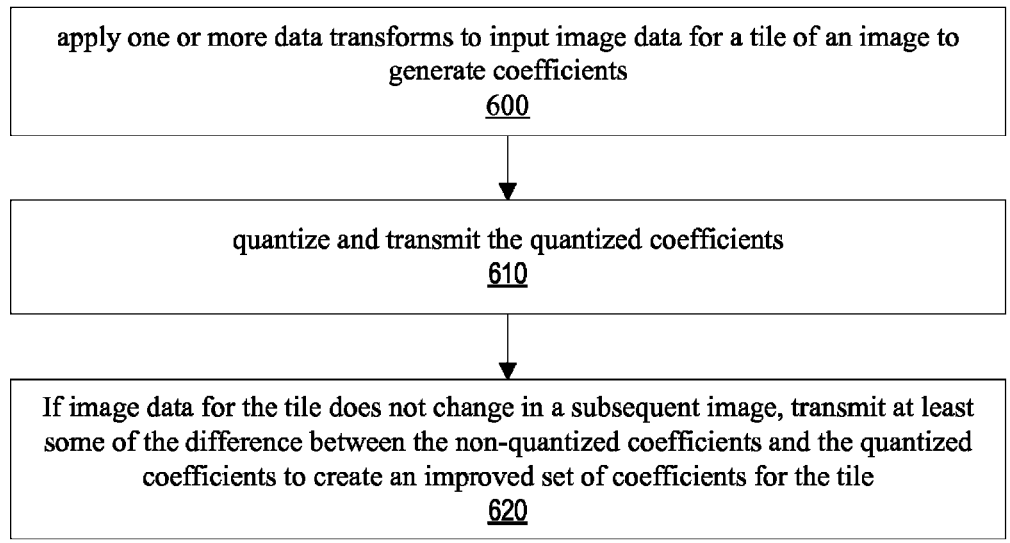
FIG. 6 is a flowchart illustrating one embodiment of a method for lossless image compression using differential transfers including quantization of coefficients, as described herein.

Turning now to FIG. 5, a flowchart illustrating one embodiment of a method for lossless image compression using differential transfers is shown. As illustrated in block 500, an image compression unit may start receiving image data for the next image in a sequence of images. For instance, as noted above, an image compression unit may receive image data from any of a variety of image data sources, such as a video camera, a still camera taking multiple images over time, or a networked screen sharing device, among others. When receiving image data for a particular image or frame out of a sequence of images, the image compression unit may receive image data for each of multiple tiles within the frame. Thus, as shown in block 510, the image compression unit may receive image data for the next tile in the image.

The image compression unit may then determine whether the image data for the tile changed relative to the corresponding tile in the previous image (i.e., frame), as illustrated in decision block 520. If, as indicated by the positive output from decision block 520, the image data for the current tile did change relative to the corresponding tile in the previous image, the image compression unit may apply data transforms to the image data for the tile to generate a set of coefficients, as indicated by block 530. For example, image compression unit 120 may be configured to apply one or more wavelet transformations to the image data, generating a set of wavelet coefficients, according to one embodiment. In other embodiments, a different type (or multiple types) of transforms may be applied to the image data when performing lossless image compression using differential transfers, as described herein.

An image compression unit may then sort the coefficients into significance groups and store the coefficients as illustrated in block 540. As noted above, multiple coefficients that have their most significant set bits in the same bit position may be referred to as a significance group, according to some embodiments. Thus, image compression unit 120 may be configured to sort the coefficients into one or more significance groups and may further store the coefficients, such as in reference buffer 460, describe above. Image compression unit 120 may be configured to store the coefficients in significance groups in some embodiments, while in other embodiments image compression unit 120 may store the coefficients using some other format or arrangement of data.

After sorting and storing the coefficients, the image compression unit may, due to resource limitations, transmit only a portion of the coefficients and may transmit them in order of the significance groups, from most significant to least significant, according to one embodiment. For instance, when transmitting over a space limited resource, such as space limited resource 150, image compression unit 120 may be configured to only transmit a portion of the coefficients, since there may not be enough bandwidth available to transmit all coefficients for all image tiles. Therefore, image compression unit 120 may transmit the portion of the coefficients in significance group order, from most significant to least significant. Thus, by transmitting the more significant of the coefficients, image compression unit 120 may transmit coefficients that may be used generating a lossy version (e.g., an approximation) of the image tile.

After sending (only a portion) of the coefficients, the image compression unit may then continue processing the remaining tiles of the frame, as illustrated by the decision block 570 of FIG. 5. Thus, image compression unit 120 may receive and process all the image data for the tiles of one frame (e.g., image) before beginning to receive image data for the next frame (e.g., image) in the sequence of images.

Returning to decision block 520, if the image data for a tile did not change relative to the corresponding tile in the previous image (e.g., frame), as indicated by the negative output from decision block 520, the image compression unit may be configured to transmit at least some of the coefficients not sent previously, as illustrated by block 560. As shown in block 560, the image compression unit may transmit the coefficients in such a manner to create an improved set of coefficients for the tile at the image data target, according to some embodiments. For example, if the image data for tile did not change relative to the previous frame, image compression unit 120 may be configured to send additional ones of the coefficients that were not sent previously. Thus, image compression unit 120 may read the coefficients stored previously, such as from reference buffer 460, and transmit some or all of the coefficients not sent previously. The data image target may then be able to create an improved set of coefficients for the tile, such as by combining the newly sent coefficients with those previously sent by the image compression unit.

In some embodiments, image compression unit 120 may send all the remaining coefficients in a second transmission (e.g., when processing the next frame), but in some embodiments, image compression unit 120 may not be able to send all the remaining coefficients in one transmission, such as due to constrained resources. Thus, in some embodiments, image compression unit 120 may be configured to send only some of the remaining coefficients when processing the next frame and if the image data for the tile doesn't change on the subsequence frame, image compression unit 120 may then send the remaining coefficients. In other words, as long as the image data for the tile or tile doesn't change, image compression unit 120 may be configured to send partial sets of the coefficients (e.g., in significance groups orders) over multiple frames, until all the coefficients have been sent. Therefore, the image data target may receive a complete set of the coefficients in a disjointed manner over multiple frames in order to construct a lossless version of the image tile.

If image compression unit 120 first sends a partial set of coefficients for an image tile, but in a subsequent frame the image data for the tile changes before image compression unit 120 has sent all the coefficients, image compression unit 120 may discard the previous coefficients and being processing the newly changed image data for the tile (such as by applying data transforms and sorting, storing and transmitting the coefficients).

While transmitting only a portion of the coefficients, as described above regarding FIG. 5, an image compression unit may transmit full copies of those coefficients that are sent, according to some embodiments. In other embodiments, an image compression unit may be configured to further compress, transform or approximate the coefficients when transmitting them over a limited resource. Turning now to FIG. 6, in which is illustrated one embodiment of a method for further processing coefficients when transmitting them as part of lossless image compression using differential transfers.

As illustrated in block 600, an image compression unit may apply one or more data transforms to image data for a tile of an image to generate coefficients, according to some embodiments. For example, image compression unit 120 may be configured to apply one or more wavelet transforms to image data, as described above. However, rather than transmit the resulting coefficients entirely, in some embodiments, an image compression unit may be configured to quantize the coefficients and transmit the resulting quantized coefficients, as illustrated in block 610. Thus, in some embodiments, image compression unit may be configured to apply one or more additional methods to reduce the overall size of the coefficients prior to transmitting them to the image data target. The quantized coefficients may then be used to generate a lossy (e.g., approximate) version of the tile on the image data target, in some embodiments.

Then, if the image data for the tile does not change in a subsequent frame, the image compression unit may transmit at least some of the difference between the non-quantized coefficients and the quantized coefficients to create an improved set of coefficients for the tile, as illustrated in block 620. For example, in one embodiment, image compression unit 120 may be configured to quantize the coefficients, such as to reduce the overall size (e.g., number of bits) in each coefficient. The quantized coefficients therefore may represent a lossy (e.g., approximate) version of the tile. If in a subsequent frame, the tile doesn't change (relative to the previous frame), image compression unit 120 may then send the difference between each non-quantized coefficient and the corresponding quantized coefficient previously sent.

For example, in one embodiment, an image compression unit may apply a simple quantization by truncating the least significant 4 bits off of each coefficient (and possibly rounding the result). Thus, the set of quantized coefficients may represent an approximate (e.g., lossily compressed) version of the image tile. If the tile doesn't change in the next frame, the image compression unit may then send those least significant bits of each coefficient (and possibly an indication of whatever rounding took place) to the image data target, to generate complete versions of the coefficients that were sent. Please note that in various embodiments, different (or multiple) types of quantization may be applied to the coefficients by an image compression unit.

Additionally, the techniques described above regarding FIG. 5 and FIG. 6 may be combined when implementing lossless image compression using differential transfers, according to some embodiments. Thus, in some embodiments, image compression unit 120 may be configured to apply data transforms to image data for a tile to generate a set of coefficients, sort those coefficients according to significance groups and quantize those coefficients, as described above. When transmitting the compressed image data to the image data target, image compression unit 120 may only transmit a portion of the quantized components. Then, if the tile does not change in a subsequent image, image compression unit 120 may then send the differences between the quantized coefficients already sent and their corresponding non-quantized formats. In addition, image compression unit 120 may also send additional non-quantized versions of coefficients that were not sent previously. Thus, in some embodiments, a combination of quantizing and only sending a portion of the total number of coefficients may be used as lossy compression when sending image data over a bandwidth- or space-limited resource.

In addition to compressing and transmitting the image data for an image tile as described above, in some embodiments, image compression unit 120 may be configured to determine the differences between two subsequent versions of the image tile. In some embodiments, this differencing may be performed after data transforms have been applied to image data. As noted previously, image compression unit 120 may store the generated coefficients for an image tile for use when processing the corresponding tile in a subsequent image/frame.

In some embodiments, the image data being sent to generate lossless versions of tiles may be sent at times other than when the specific tiles are being processed. For instance, image compression unit 120 may be configured to determine that a tile has not changed relative to a previous frame and if there is no additional image data needed to be sent for that tile (i.e., the image data target already has a lossless version of that tile) image compression unit 120 may send additional image data for a different tile whose image data was sent using lossy compression previously. In other words, when it is determined that a tile has not changed, if there is no image data to be sent for that tile, image data for another tile (e.g., additional coefficients) may be sent if bandwidth allows, according to some embodiments. Additionally, image compression unit 120 may also send information alerting image decompression unit 130 that the image data is being out of order and identifying the tile to which it belongs. Furthermore, image decompression unit 130 may, in some embodiments, be configured to receive image data for a tile out of order and generate lossless image data for that tile.

Figure 7:
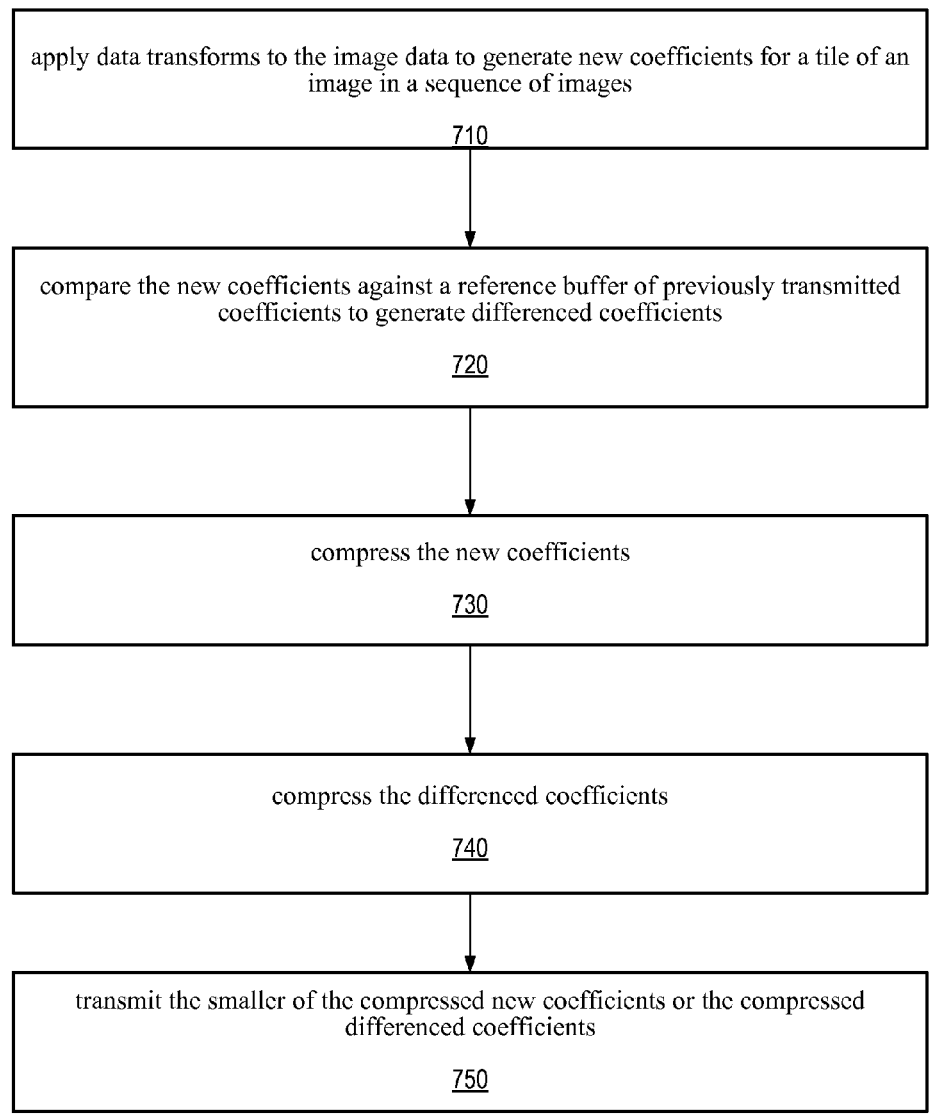
FIG. 7 is a flowchart illustrating one embodiment of a method for lossless image compression using differential transfers.

Turning now to FIG. 7, an image compression unit may apply data transforms to the image data to generate new coefficients for the tile, as shown in block 710. For example, image compression unit 120 may be configured to apply one or more wavelet transforms to the image data for the tile thereby generating a set of coefficients. As illustrated in block 720, the image compression unit may then compare the new coefficients against a reference buffer of previously transmitted coefficients to generate differenced coefficients. For example, image compression unit 120 may be configured to compare the new coefficients against coefficients stored in reference buffer 460 to determine the differences between the two sets of coefficients. The set of coefficients may then represent the difference between the two versions of the tile. Thus, image compression unit 120 may be configured to determine differences between two versions of an image tile by comparing the transformed image data (e.g., comparing in "transform space") rather than by comparing the raw image data.

While in some embodiments, an image compression unit may then send the differences between the two sets of coefficients, in other embodiments an image compression unit may be configured to determine whether it would be more efficient (e.g., in terms of transmitted data size) to send the differences or the new coefficients themselves. Thus, the image compression unit may compress the new coefficients, as shown in block 730, compress the differenced coefficients, as shown in block 740, and transmit the smaller of the two, as shown in block 750. In other words, in some embodiments, image compression unit 120 may be configured to determine whether it may be more efficient (in terms of transmitted data size) to transmit new image data (e.g., after being compressed) rather than just the differences between the new image data and the previous image data for the image tile.

Please note that whether sending the new image data or the differenced image data, the data being sent may be transmitted using any of the techniques described herein. In other words, when sending differenced coefficients, image compression unit 120 may be configured to send only a portion of them (e.g., due to limited bandwidth) when processing one image frame and to send the remainder of the differenced coefficients when processing subsequent frame (e.g., if the tile does not change).

Figures 8, 9:
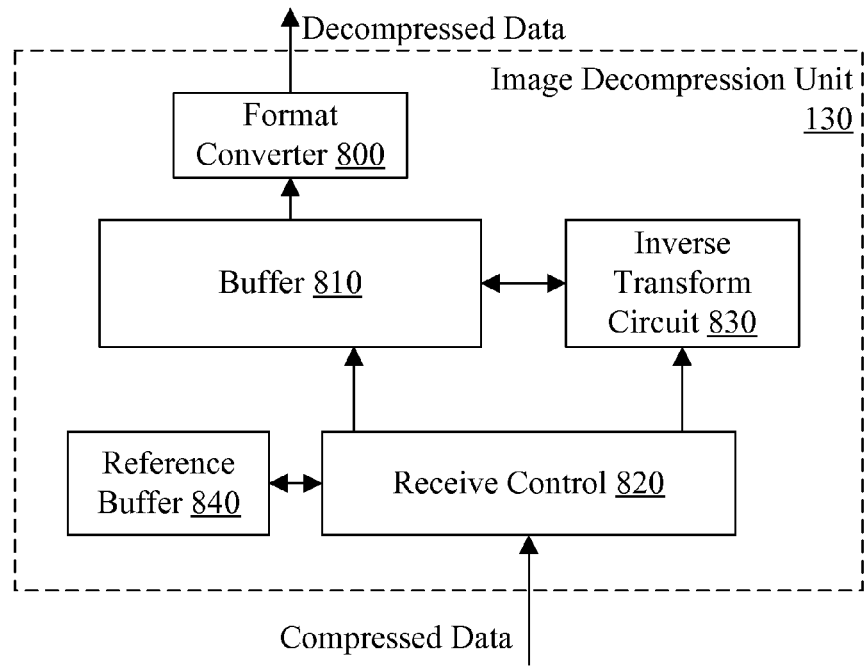
FIG. 8 is a logical block diagram illustrating an image decompression unit, according to one embodiment.
FIG. 9 is a flowchart illustrating one embodiment of a method for lossless image compression using differential transfers.

FIG. 8 is a block diagram of one embodiment of an image decompression unit 130. As described above, image decompression unit 130 may be configured to reverse the operation of image compression unit 120, producing the original uncompressed data or an approximation thereof. In other words, image decompression unit 130 may be designed with an awareness of the compression algorithm used by image compression unit 120. Additionally, if parameters of the compression algorithm are programmable (or configurable), both image compression unit 120 and image decompression unit 130 may be programmed (or configured) in the same fashion to ensure that image decompression unit 130 properly interprets the received data.

In the embodiment of FIG. 8, image decompression unit 130 includes a buffer 810, a receive control circuit 820, an inverse transform circuit 830, a format converter 800 and a reference buffer 840. The receive control circuit 820 is coupled to receive compressed data and is coupled to the buffer 810 and the inverse transform circuit 830. The inverse transform circuit 380 and the format converter 800 are coupled to the buffer 810 as well, and the format converter 800 is coupled to output decompressed data.

The buffer 810 may be configured to store one or more tiles of data, in various embodiments. Initially, the buffer 810 may store the list of coefficients received by the receive control circuit 820, and subsequently the data may be transformed back to the original tile data (or an approximation thereof, for lossy compression). Accordingly, the receive control circuit 820 may perform the decompression. The receive control circuit 820 may receive the compressed data (e.g. in the form of coefficient list addresses and coefficient values) and may reconstruct the transformed tile in the buffer 810. The inverse transform circuit 830 may be configured to apply the inverse of the transformations applied to the data by the image compression unit 120, in the reverse order that the transformations were applied if more than one is used. The format converter 800 may be configured to convert the data to RGB format from YUV, and may be optional and not included in some embodiments if format conversion is not performed.

Turning now to FIG. 9, in which one embodiment of a method for receiving data according to lossless image compression using differential transfers is illustrated. As shown in block 900, an image decompression unit, such as image decompression unit 130, may be configured to receive compressed image data for an image in a sequence of images where the image data for at least some of the tiles of the image was sent using lossy compression. The image decompression unit may then receive compressed image data for a subsequent image in such a manner as to create lossless versions of tiles which were previously sent using lossy compression.

For example, image decompression unit 130 may receive lossily compressed image data for an image tile and then subsequently (e.g., as part of the next image) image decompression unit 130 may receive additional image data for that tile that allows a lossless version of that tile to be generated.

In another example, image decompression unit 130 may receive image data consisting of a set of quantized coefficients for an image tile and may subsequently receive the difference between the quantized coefficients previously sent and the full non-quantized coefficients, thereby allowing generation of a lossless version of the image tile.

Thus, image decompression unit 130 may be configured to receive image data for an image tile over multiple image frames, where the first set of image data for the tile is sent using a lossy compression and where the subsequent image data is sent in a manner allowing creation of a lossless version of the tile.

Figure 10:
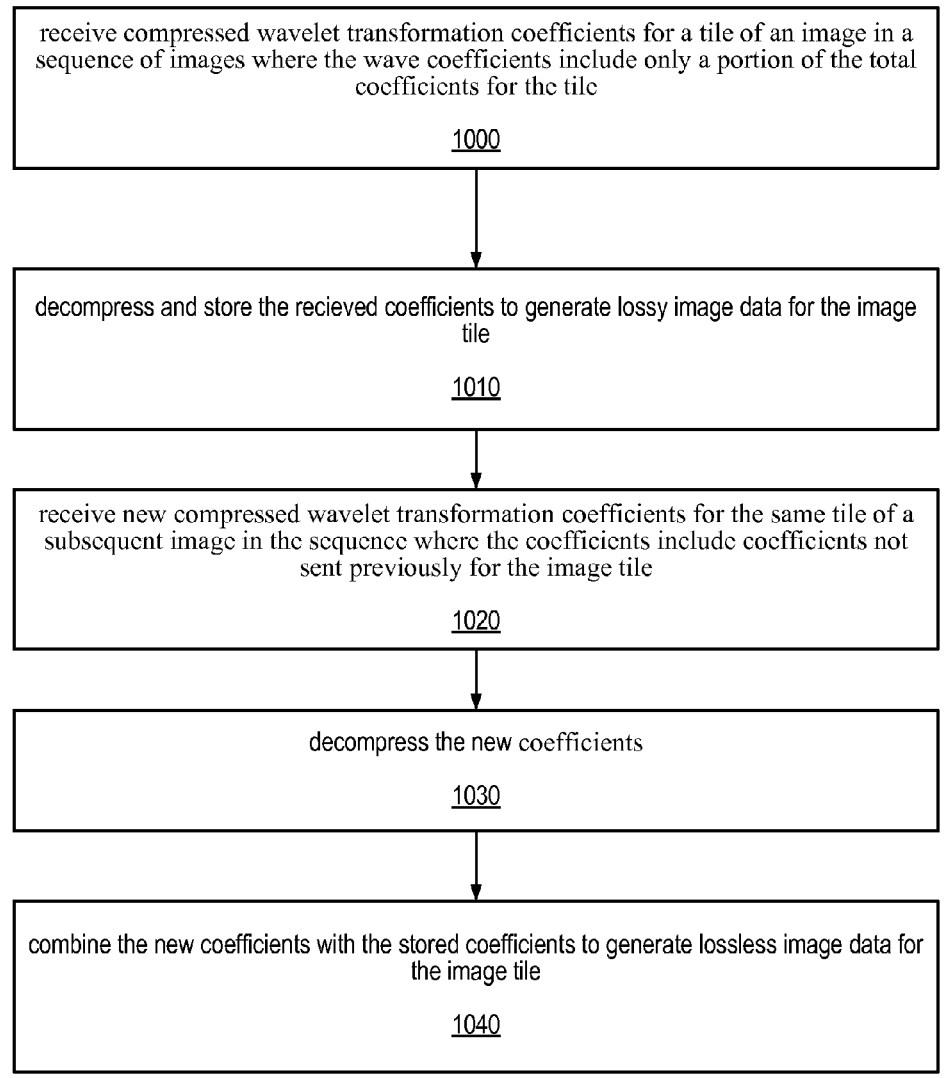
FIG. 10 is a flowchart illustrating one embodiment of a method for lossless image compression using differential transfers.

FIG. 10 is a flowchart illustrating one embodiment of a method for receiving compressed image data according to lossless image compression using differential transfers, as described herein. As shown in block 1000, an image decompression unit may receive compressed wavelet transformation coefficients for a tile of an image in a sequence of images where the wave coefficients include only a portion of the total coefficients for the tile. The image decompression unit may then decompress and store the received coefficients to generate lossy image data for the image tile. For instance, image compression 120 may only send a portion of the wavelet coefficients for an image tile and image decompression unit 130 may receive and store those wave coefficients to generate lossy image data for the tile.

For example, image decompression unit 130 may receive a set of wavelet transformation coefficients for a tile from image compression unit 120, but those coefficients may only be a portion of the total coefficients for the tile. Thus, image decompression unit 130 may receive, decompress and store the coefficients. Since the coefficients are less than the total set of coefficients for the tile, the image data resulting from reversing the wavelet transformation(s) may generate lossy image data for the tile.

As shown in block 1020, the image decompression unit may then receive new compressed wavelet transformation coefficients for the same tile of a subsequent image in the sequence where the coefficients include coefficients not sent previously for the image tile. Thus, when processing a subsequent image frame, image decompression unit 130 may receive the remainder of the coefficients (e.g., coefficients not sent in the previous, partial, set of coefficients). The image decompression unit may then decompress the new coefficients, as shown in block 1030, and combine the new coefficients with the stored coefficients to generate lossless image data for the image tile, as shown in block 1040. Thus, image decompression unit 130 may, in some embodiments, be configured to combine the two (or more) sets of coefficients received over multiple image frames to create lossless image data for an image tile.

Please note that while described above regarding a single image tile and two subsequence image frames, the method illustrated by the flowchart in FIG. 10 may be applied to multiple image tiles and the transmission of data across multiple image frames. For example, if an image tile does not change, image decompression unit 130 may combine coefficients received as three sets (one with each of three image frames) to generate lossless image data for the tile.

Furthermore, any of various methods of lossy compression may be used instead of, or in conjunction with, the techniques described regarding FIG. 9 and FIG. 10.

Figure 11:
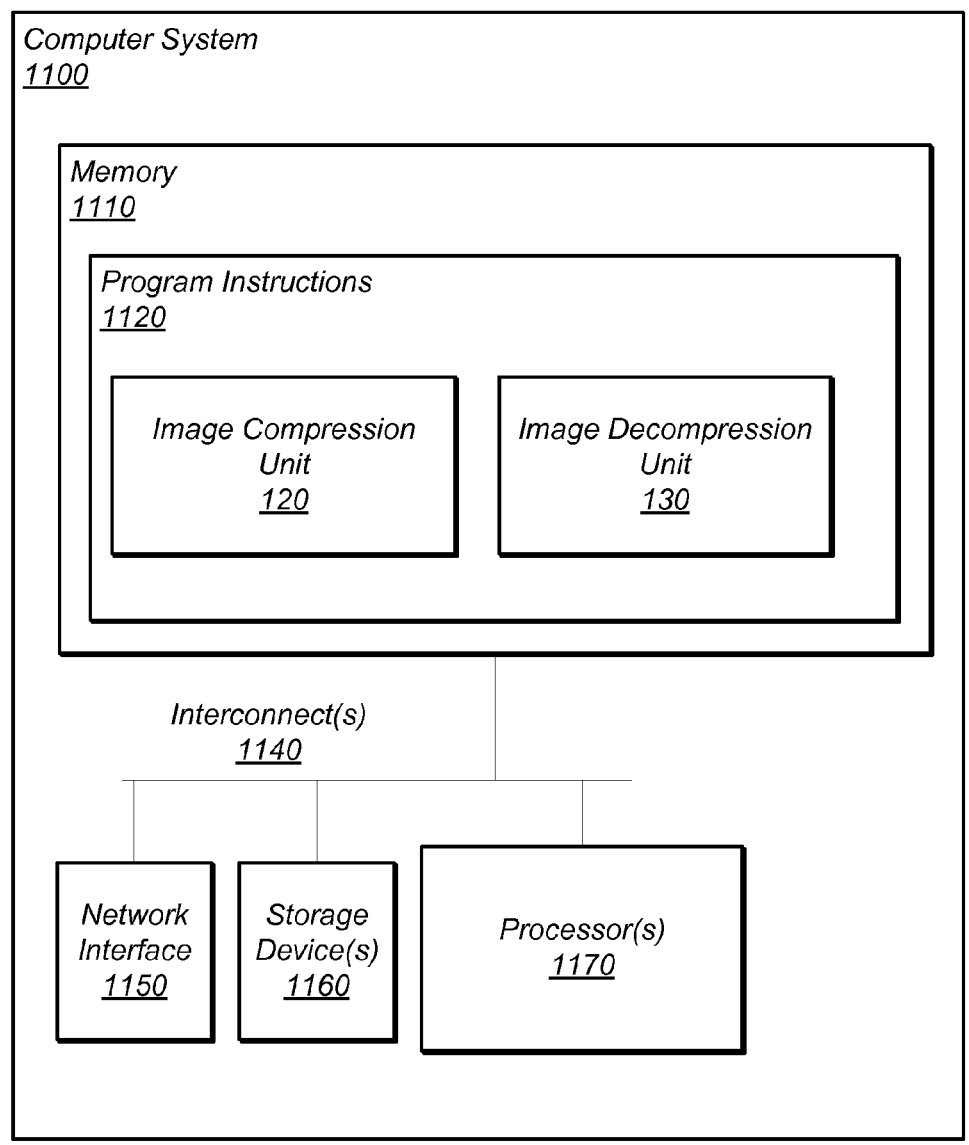
FIG. 11 is a logical block diagram illustrating, according to one embodiment, a computer system capable of performing lossless image compression using differential transfers as described herein.

The techniques described herein for lossless image compression using differential transfers may be implemented on any of a wide variety of computing devices. FIG. 11 illustrates an example computing system that is configured to implement lossless image compression using differential transfers, as described herein and according to various embodiments. Computer system 1100 may be any of various types of computing device, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1100 may include a processor unit 1170 (possibly including multiple processors, a single-threaded processor, a multi-threaded processor, a multi-core processor, etc.) which may be configured to execute one or more modules, such as image compression unit 120 and/or image decompression unit 130, which may be present within program instructions 1120 stored in memory 1110 of the same computer system 1100 or may be present within program instructions stored within a memory of another computer system similar to or different from computer system 1100. In some embodiments, computer system 1100 may include image compression unit 120 while in other embodiments, computer system 1100 may include image decompression unit 130. In yet other embodiments, computer system 1110 may include both image compression unit 120 and image decompression unit 130.

The computer system 1100 may include one or more system memories 1110 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1150 (e.g., an ATM interface, an Ethernet interface, a Frame Relay interface, etc.), and one or more storage device(s) 1160 (e.g., optical storage, magnetic storage, etc.). The memory medium may include other types of memory as well, or combinations thereof.

In other embodiments, computer system 1100 may include more, fewer, or different components than those illustrated in FIG. 11 (e.g., video cards, audio cards, additional network interfaces, peripheral devices, etc.). For instance, in one embodiment, computer system 1100 may not include network interface 1150. The processor(s) 1170, the storage device(s) 1160, the network interface 1150 and the system memory 1110 may be coupled to the system interconnect 1140.

One or more of the system memories 1110 may include program instructions 1120 configured to implement some or all of the techniques described herein for lossless image compression using differential transfers (according to any of the embodiments described herein). For example, one or more of the system memories 1110 may include code to implement and/or execute image compression unit 120 and/or image decompression unit 130, according to one embodiment.

In various embodiments, program instructions 1120, image compression unit 120, image decompression unit 130, and/or individual sub-modules of these components may each be implemented in any of various programming languages or methods. For example, in one embodiment, image compression unit 120 and/or image decompression unit 130 may be JAVA based, while in another embodiment, image compression unit 120 and/or image decompression unit 130 may be written using the C or C++ programming languages. Moreover, in some embodiments, image compression unit 120, image decompression unit 130 and various sub-modules of them may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing, by a computing device:
receiving image data for a first image in a sequence of images, wherein each image in the sequence comprises a plurality of image tiles;
transmitting the image data for the first image, wherein said transmitting comprises:
transmitting image data for at least some of the first image's plurality of tiles using lossy compression due to resource constraints;
wherein said transmitting image data for at least some of the first image's plurality of tiles using lossy compression due to resource constraints comprises:
quantizing a plurality of data transform coefficients to generate a corresponding plurality of quantized coefficients, wherein the plurality of data transform coefficients are based on the image data; and
transmitting the plurality of quantized coefficients;
receiving image data for a subsequent image in the sequence of images;
determining that the image data for at least some of the subsequent image's plurality of tiles does not change more than a predetermined amount relative to image data for corresponding tiles of the first image; and
transmitting the image data for the subsequent image in a manner sufficient to create lossless versions of tiles for which lossily compressed data was previously sent, wherein said transmitting the image data for the subsequent image comprises:
comparing the plurality of data transform coefficients to the plurality of quantized coefficients to generate a plurality of coefficient differentials; and
transmitting the plurality of coefficient differentials.

2. The method of claim 1, further comprising applying one or more data transforms to the image data for the first image to generate the plurality of data transform coefficients.

3. The method of claim 2, wherein said transmitting image data for at least some of the first image's plurality of tiles using lossy compression due to resource constraints comprises transmitting only a portion of the plurality of data transform coefficients.

4. The method of claim 3, further comprising:
sorting the plurality of data transform coefficients into a plurality of significance groups, wherein each coefficient in a given significance group has a same most significant set bit or bits, wherein the subset of the coefficients comprises a first portion of the plurality of data transform coefficients in order of the plurality of significance groups, from most significant to least significant; and
wherein said transmitting only a portion of the plurality of data transform coefficients comprises transmitting the portion of the plurality of data transform coefficients in order of the significance groups, from most significant to least significant.

5. The method of claim 3, wherein said transmitting the image data for the subsequent image comprises transmitting at least some of a remainder of the plurality of data transform coefficients, wherein the remainder of the coefficients were not sent previously.

6. The method of claim 2, wherein the one or more data transforms comprise one or more wavelet transforms.

7. The method of claim 2, wherein the one or more data transforms comprise one or more color space conversions.

8. The method of claim 1, further comprising receiving image change information indicating, for each of the subsequent image's plurality of tiles, whether the respective tile changes relative to a corresponding tile of the first image's plurality of tiles, wherein said determining that the image data for at least some of the subsequent image's plurality of tiles does not change is based, at least in part, on the received image change information.

9. The method of claim 1, wherein said determining that the image data for at least some of the subsequent image's plurality of tiles does not change more than a predetermined amount comprises determining that the image data for at least some of the subsequent image's plurality of tiles does not change at all relative to the image data for corresponding tiles of the first image.

10. A method, comprising:
performing, by a computing device:
maintaining a reference buffer configured to store image data;
receiving compressed image data for a first image in a sequence of images, wherein each image in the sequence comprises a plurality of image tiles, wherein the image data for at least some of the first image's plurality of image tiles was sent using lossy compression;
storing the received compressed image data to the reference buffer;
receiving compressed image data for a subsequent image in the sequence, wherein the compressed image data for the subsequent image comprises information sufficient to create lossless versions of one or more of the subsequent image's tiles, wherein the information sufficient to create lossless versions of one or more of the subsequent image's tiles comprises:
information sufficient to create lossless versions of one or more of the first image's plurality of image tiles for which image data was sent using lossy compression, and
delta information comprising information representing changes to the one or more of the first image's plurality of image tiles sufficient to create lossless versions of corresponding tiles of the subsequent image,
wherein each of the one or more of the subsequent image's tiles correspond to a respective one of the at least some of the first image's plurality of image tiles for which image data was sent using lossy compression;
combining the compressed image data for the subsequent image with the compressed image data stored in the reference buffer to generate complete image data; and
generating a lossless version of the one or more of the subsequent image's tiles based on the complete image data.

11. The method of claim 10, further comprising:
wherein generating the lossless version of the one or more image tiles of the subsequent image is based on a plurality of compressed wavelet transformation coefficients for the image tile of the first image and an additional one or more compressed wavelet transformation coefficients for an image tile of the subsequent image corresponding to the image tile of the first image;
wherein said receiving compressed image data for the first image comprises receiving the plurality of compressed wavelet transformation coefficients for an image tile of the first image, wherein the plurality of compressed wavelet transformation coefficients represent only a portion of a total number of wavelet transformation coefficients for the image tile; and wherein said receiving compressed image data for the subsequent image comprises receiving the additional one or more compressed wavelet transformation coefficients, wherein the additional compressed wavelet transformation coefficients comprise coefficients not part of the plurality of compressed wavelet transformation coefficients for the image tile of the first image.

12. The method of claim 11, wherein said generating a lossless version of the image tile of the subsequent image, comprises:

uncompressing the plurality of compressed wavelet transformation coefficients for the image tile of the first image;

uncompressing the additional compressed wavelet transformation coefficients for the image tile of the subsequent image; and combining the uncompressed wavelet transformation coefficients for the image tile of the first image with the uncompressed additional wavelet transformation coefficients for the image tile of the subsequent image.

13. The method of claim 12, further comprising applying one or more reverse data transforms to the combined uncompressed wavelet transformation coefficients.

14. A system, comprising:

an image data source comprising an image compression unit; and an image data target comprising an image decompression unit;

wherein the image compression unit is configured to transmit lossily compressed original image data to the image decompression unit, wherein the original image data corresponds to an image tile of a first image in a sequence of images;

wherein to transmit the lossily compressed original image data the image compression unit is configured to:

compare a plurality of data transform coefficients to a plurality of previously transmitted coefficients to generate a plurality of differenced coefficients, wherein the plurality of data transform coefficients are based on the original image data;

compress the plurality of data transform coefficients to generate a plurality of compressed data transform coefficients;

compress the plurality of differenced coefficients to generate a plurality of compressed differenced coefficients; and transmit the smaller of either the plurality of compressed data transform coefficients or the plurality of compressed differenced coefficients as the compressed original image data;

wherein the image decompression unit is configured to decompress the compressed original image data, wherein the decompressed original image data corresponds to a lossy version of the image tile;

wherein the image compression unit is further configured to:

determine that additional image data for a corresponding image tile of a subsequent image in the sequence of images has not changed relative to the original image data; and transmit further image data to the image decompression unit in a manner sufficient to generate a lossless version of the image tile;

wherein the image decompression unit is further configured to generate a lossless version of the image tile of the subsequent image based at least in part of the further image data.

15. The system of claim 14, wherein the image compression unit is configured to:

apply one or more wavelet transforms to the uncompressed original image data for the image tile of the first image to generate the plurality of data transform coefficients; and transmit only a portion of the plurality of coefficients as the lossily compressed original image data.

16. The system of claim 15, wherein to generate the lossless version of the image tile of the subsequent image, the image decompression unit is configured to apply one or more reverse wavelet transforms to the plurality of data transform coefficients.

17. The system of claim 14, wherein the image compression unit is further configured to:

transmit image data for an intermediate image in the sequence of images, wherein the intermediate image follows the first image and precedes the subsequent image in the sequence of images; and transmit at least a portion of the further image data with the image data for the intermediate image.

* * * * *